(12) United States Patent
TenBrink

(10) Patent No.: US 9,842,515 B1
(45) Date of Patent: Dec. 12, 2017

(54) APPARATUS FOR SURGICAL TRAINING

(71) Applicant: Encoris Group Corporation, Inc., Holland, MI (US)

(72) Inventor: Jim TenBrink, Holland, MI (US)

(73) Assignee: Encoris Group Corporation, Inc., Holland, MI (US)

( * ) Notice: Subject to any disclaimer, the term of this patent is extended or adjusted under 35 U.S.C. 154(b) by 365 days.

(21) Appl. No.: 14/506,304

(22) Filed: Oct. 3, 2014

Related U.S. Application Data

(60) Provisional application No. 61/886,374, filed on Oct. 3, 2013, provisional application No. 61/895,568, filed on Oct. 25, 2013.

(51) Int. Cl.
*G09B 23/32* (2006.01)

(52) U.S. Cl.
CPC .................... *G09B 23/32* (2013.01)

(58) Field of Classification Search
CPC ...... G09B 23/28; G09B 23/285; G09B 23/30; G09B 23/303; G09B 23/34; G09B 23/32
See application file for complete search history.

(56) References Cited

U.S. PATENT DOCUMENTS

| | | | |
|---|---|---|---|
| 5,947,743 A * | 9/1999 | Hasson | G09B 23/286 434/262 |
| 6,544,041 B1 | 4/2003 | Damadian | |
| 6,769,286 B2 | 8/2004 | Biermann et al. | |
| 6,780,016 B1 | 8/2004 | Toly | |
| 6,790,043 B2 | 9/2004 | Aboud | |
| 6,929,481 B1 | 8/2005 | Alexander et al. | |
| 7,594,815 B2 | 9/2009 | Toly | |
| 7,648,367 B1 | 1/2010 | Makower et al. | |
| 7,837,473 B2 | 11/2010 | Koh | |
| 7,866,983 B2 | 1/2011 | Hemphill et al. | |
| 7,931,471 B2 | 4/2011 | Senagore et al. | |
| 7,963,770 B2 | 6/2011 | Kukora et al. | |
| 8,007,281 B2 | 8/2011 | Toly | |
| 8,162,668 B2 | 4/2012 | Toly | |
| 8,251,703 B2 | 8/2012 | Zamierowski et al. | |
| 8,297,982 B2 | 10/2012 | Park et al. | |
| 8,308,486 B2 | 11/2012 | Kokora et al. | |
| 8,382,485 B2 | 2/2013 | Bardsley et al. | |
| 8,403,675 B2 | 3/2013 | Stoianovici et al. | |
| 8,403,676 B2 | 3/2013 | Frassica et al. | |
| 2005/0064378 A1* | 3/2005 | Toly | G09B 23/285 434/262 |
| 2007/0243512 A1* | 10/2007 | King | G09B 23/28 434/268 |
| 2010/0248201 A1* | 9/2010 | Hill | G09B 23/30 434/272 |

(Continued)

OTHER PUBLICATIONS

Limbs & Things Beinging Skills Training to Life—2014 Catalog, 100 pages, www.limbsandthings.com.

*Primary Examiner* — Timothy A Musselman
(74) *Attorney, Agent, or Firm* — McGarry Bair PC

(57) ABSTRACT

An apparatus for simulating an animal body cavity for training surgical techniques therein comprises a housing defining an internal cavity with an externally-facing opening therein for access by a trainee to the internal cavity. A cover made of a flexible material which is penetrable by a surgical instrument conceals the opening. At least one internal anatomy and at least one camera are positioned within the internal cavity.

19 Claims, 10 Drawing Sheets

(56) References Cited

U.S. PATENT DOCUMENTS

| | | | |
|---|---|---|---|
| 2011/0193943 A1* | 8/2011 | Campbell | F16M 11/04 348/46 |
| 2012/0082970 A1* | 4/2012 | Pravong | G09B 23/30 434/262 |
| 2013/0122478 A1* | 5/2013 | Takasu | G09B 23/28 434/275 |
| 2014/0011172 A1* | 1/2014 | Lowe | G09B 23/30 434/273 |

* cited by examiner

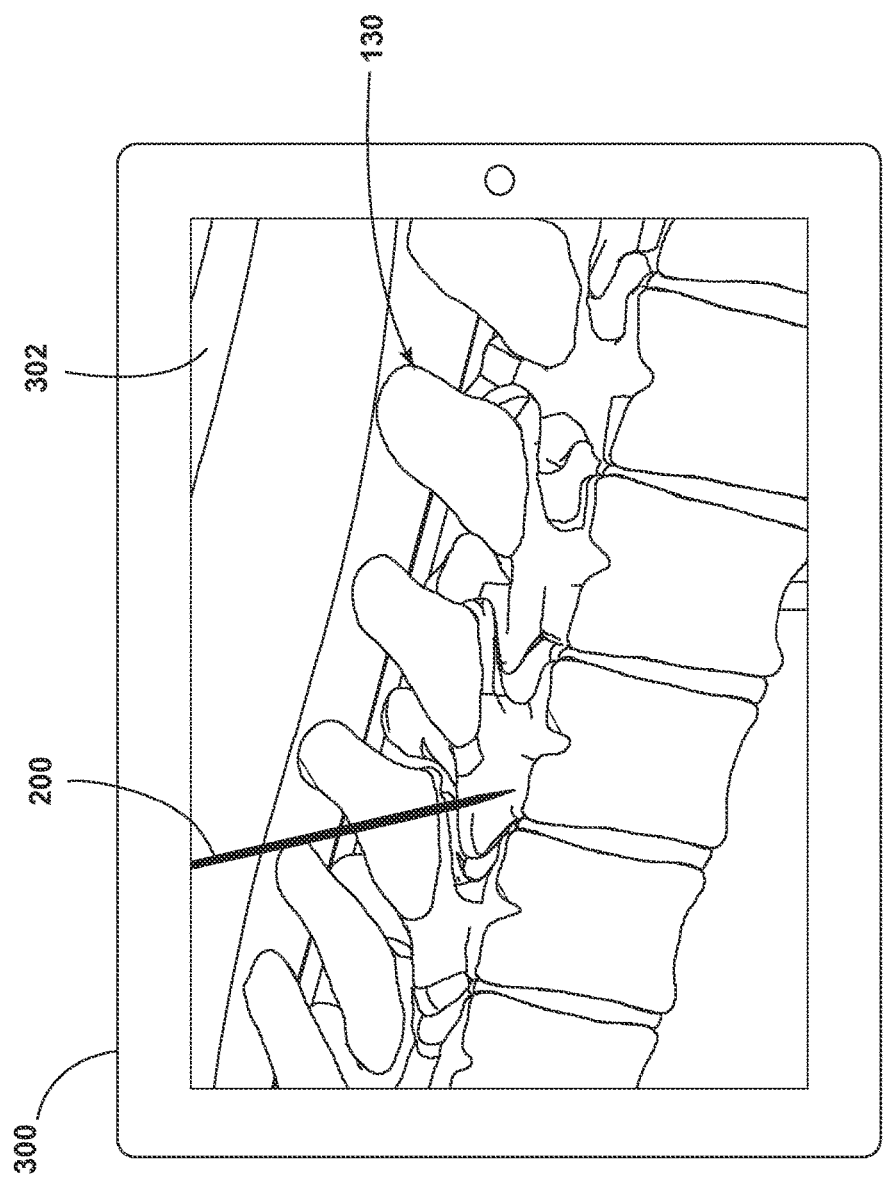

APPARATUS FOR SURGICAL TRAINING

CROSS-REFERENCE TO RELATED APPLICATIONS

This application claims the benefit of U.S. Provisional Patent Application No. 61/886,374, filed Oct. 3, 2013 and U.S. Provisional Patent Application No. 61/895,568, filed Oct. 25, 2013 which are incorporated herein by reference in their entirety.

BACKGROUND

The embodiments of the invention relate generally to the field of a medical device training aids, and more specifically, but not exclusively, to a surgical training models.

Anatomical models are being utilized to replace cadaveric specimens for the surgical training of medical practitioners. The demand to demonstrate new surgical instruments, practice surgical techniques and to evaluate the use of new surgical implants is increasingly important in the evolving medical field.

Typically, medical practitioners have used cadavers or alternatively, generic anatomical models for surgical training. The lack of availability of cadaveric specimens and the high costs associated with the use and disposal of cadaveric specimens has decreased the demand by medical practitioners and medical device companies to utilize this tool for training purposes. The alternative anatomical models are increasingly being used to display newly developed implant devices and on which to perform practice surgical procedures. These models may be equipped with realistic anatomic features and soft-tissue characteristics.

To view the surgical procedure of implanting an instrument or medical device in the cadaveric specimens or anatomical models, medical practitioners rely on the use of expensive X-ray equipment and facilities.

BRIEF SUMMARY

The embodiments of the invention relate to an apparatus for simulating an animal body cavity for training surgical techniques therein. The apparatus comprises a housing defining an internal cavity with an externally-facing opening therein for access by a trainee to the internal cavity. A cover made of a flexible material conceals the opening and is made of a substance which is penetrable by a surgical instrument. At least one internal anatomy is positioned within the internal cavity. At least one camera is provided on the housing with visual access to the internal cavity and a transmitter is operably interconnected to the camera for transmitting images of the internal cavity to at least one receiver located externally of the housing. A trainee can simulate a surgical procedure relating to the at least one internal anatomy using the apparatus by accessing the internal cavity through the cover with the surgical instrument, and visual representations of the interior of the internal cavity from the at least one camera can be broadcast by the transmitter to at least one receiver.

BRIEF DESCRIPTION OF THE DRAWINGS

In the drawings:

FIG. 6A is an elevation view of a display showing a view of a surgical instrument inserted in a surgical training apparatus according to an embodiment of the invention.

DETAILED DESCRIPTION

Figure 1:
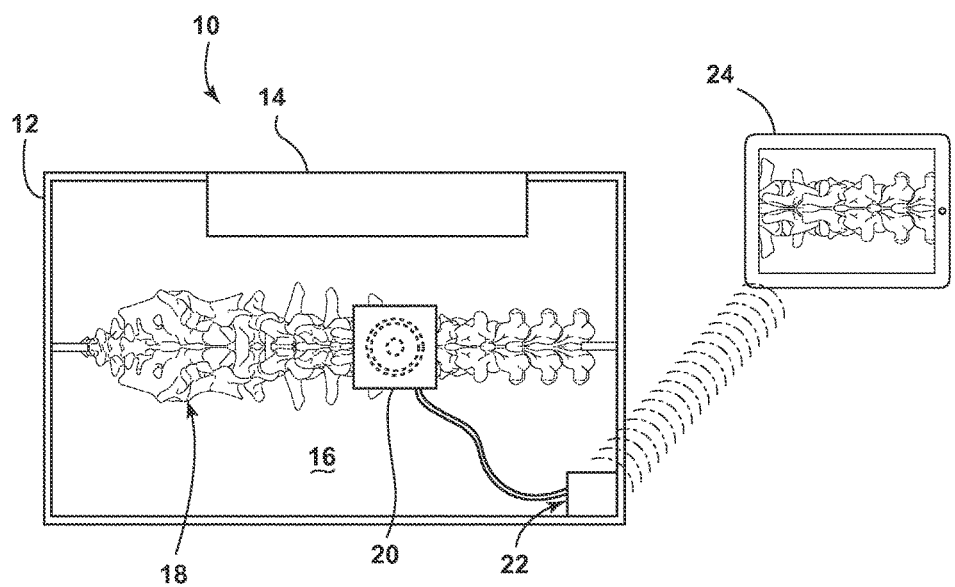
FIG. 1 is an elevation view of a surgical training apparatus according to an embodiment of the invention.

Referring now to the drawings and to FIG. 1 in particular, there is shown a surgical training apparatus 10 according to an embodiment of the invention that is used for simulating an animal body cavity for training surgical techniques therein. The surgical training apparatus 10 comprises a housing 12 that defines an internal cavity 16. The housing 12 is provided with an externally-facing opening to allow access by a trainee to the internal cavity 16. At least one internal anatomy 18 is positioned within the internal cavity 16. A cover 14 is provided for concealing the opening. The cover is made from a flexible material and may be of a substance which is penetrable by a surgical instrument. At least one camera 20 is provided on or within the housing 12 that has visual access to the internal cavity 16. A transmitter is operably interconnected to the at least one camera 20 for transmitting images of the internal cavity 16 to at least one receiver 24 located externally of the housing 12. It will be understood that the term animal as used herein may be any member of the kingdom Animalia, including human beings.

In use, a trainee can simulate a surgical procedure relating to the at least one internal anatomy 18 using the surgical training apparatus 10 by accessing the internal cavity 16 through the cover 14 with the surgical instrument. A visual representations of the interior of the internal cavity 16 from the at least one camera 20 can be broadcast by the transmitter 22 to the at least one receiver 24. In this way, the trainee or others may view the surgical instrument and internal anatomy 18 in the internal cavity 16 during the surgical procedure in real time.

Figure 2:
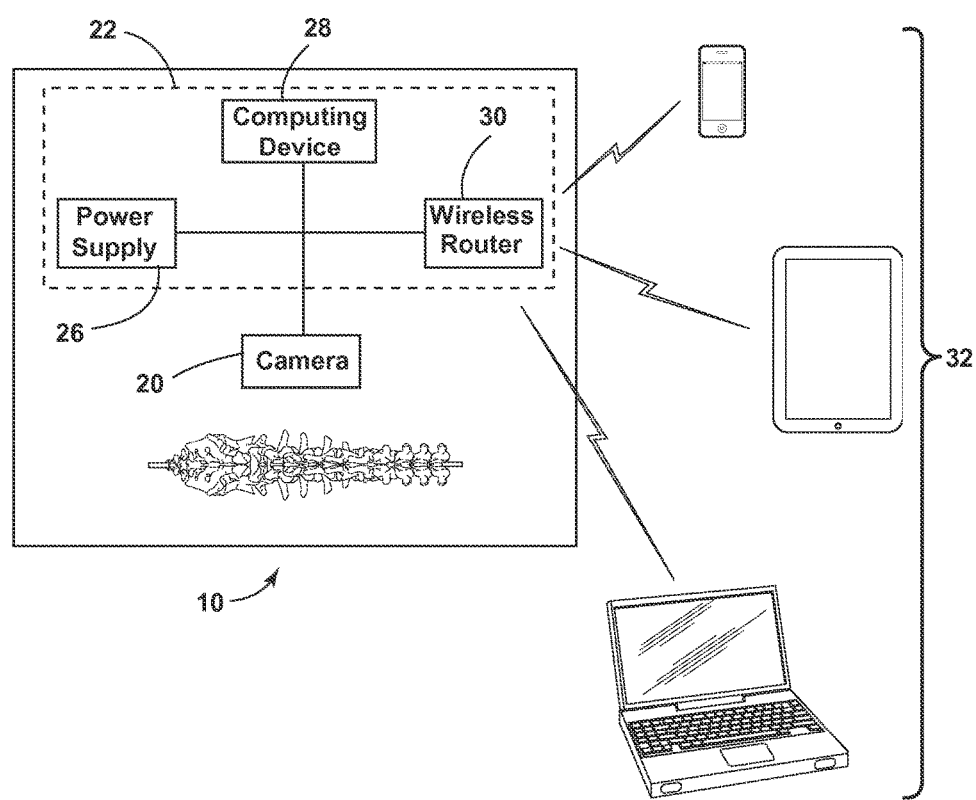
FIG. 2 is a schematic representation of a surgical training apparatus according to an embodiment of the invention.

As shown in FIG. 2, the transmitter 22 comprises a power source 26, a computing device 28 and a wireless router 30. The power source 26 is configured to supply power to the computing device 28, wireless router 30 and camera 20 and may be a rechargeable battery such as a lithium ion battery or a power cord plugged into an electrical outlet.

The at least one camera 20 is configured to encode digital images and/or video. The digital images and/or video may be stored directly on the camera 20 or sent directly to the computing device 28 using a wired or wireless connection. The camera 20 may be equipped with optical zoom and may be configured to encode and send images or video at 1080p resolution.

The computing device 28 is programmed to control both the camera 20 and the wireless router 30 and may in the form of a simple computer including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The wireless router 30 is operably connected to the computing device 28 and acts as a wireless access point, allowing other remote computing devices 32 such as smartphones, tablets and laptops to connect to computing device 28 using Wi-Fi. The wireless router 30 may also be integrally formed with the computing device 28.

The computing device 28 is programmed such that the camera 20 encodes a digital image at preset time intervals, such as every 3 seconds or alternatively, encodes continuous video. The digital images and/or video may be permanently or temporarily stored on the computing device 28 memory. Once other remote computing devices 32 connect to computing device 28 using Wi-Fi broadcast by the wireless router 30, the computing device 28 is programmed such that remote computing devices 32 automatically display the images or video encoded by the camera 20.

Figure 3:
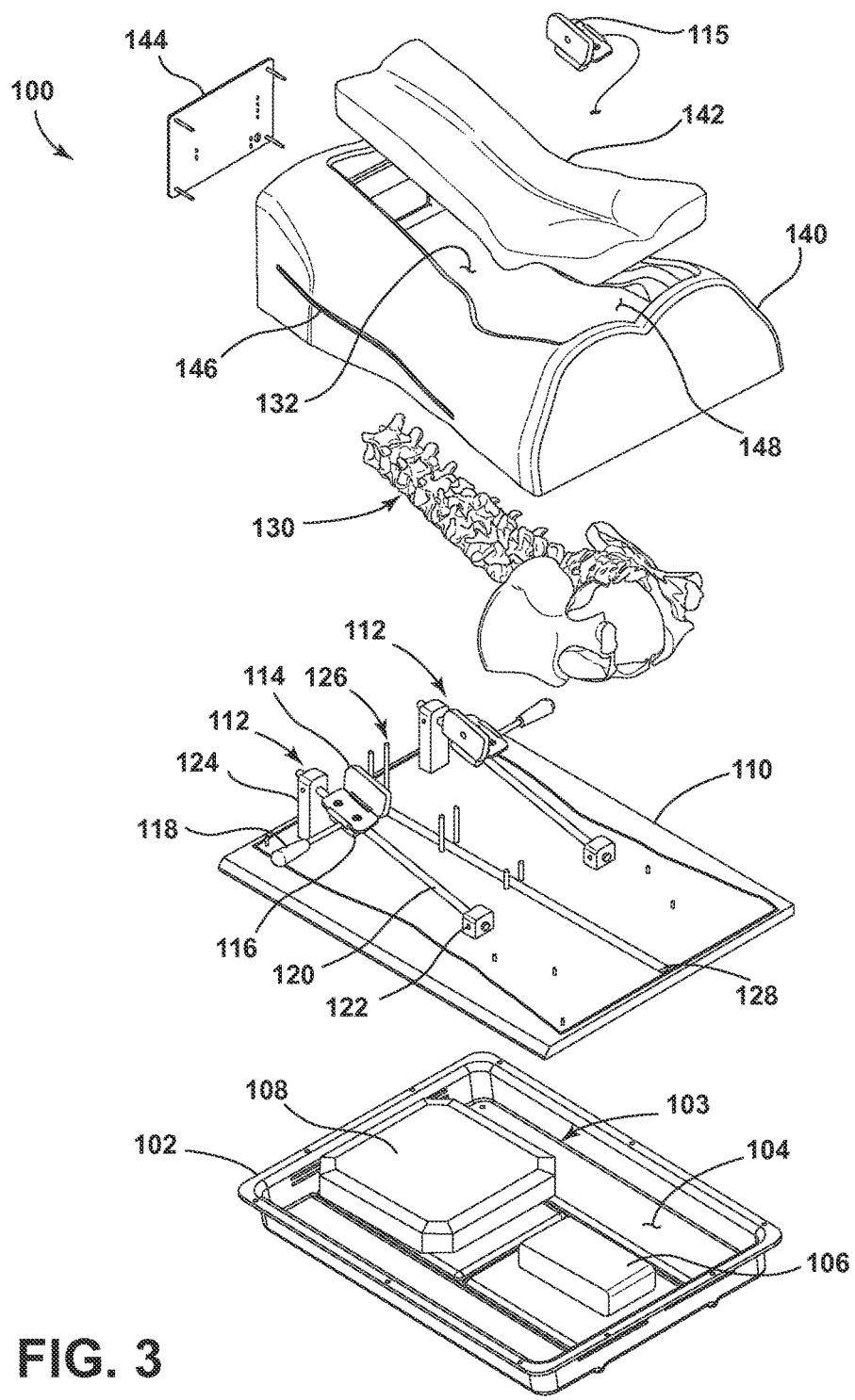
FIG. 3 is an exploded view of a surgical training apparatus according to another embodiment of the invention.
Figure 4:
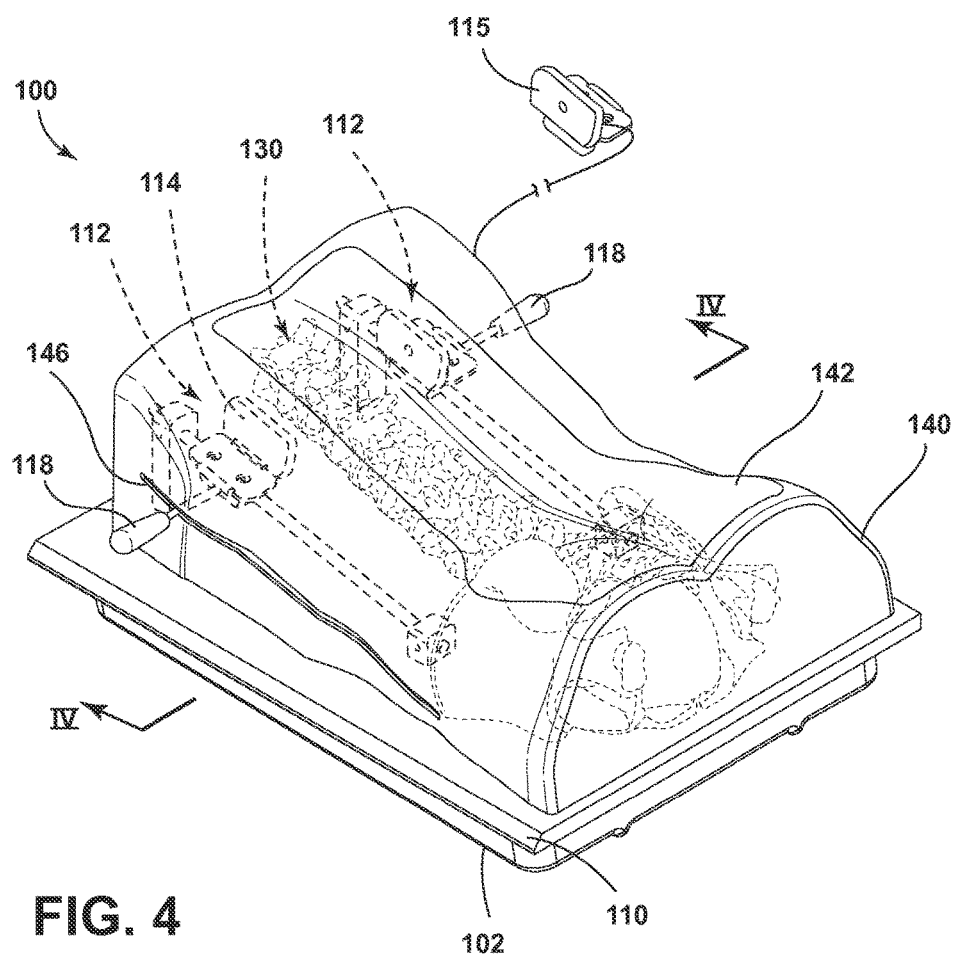
FIG. 4 is a perspective view of a surgical training apparatus according to another embodiment of the invention.

Referring now to FIG. 3 and FIG. 4, there is shown an exploded view and perspective view of a surgical training apparatus 100, respectively, according to another embodiment of the invention. The surgical training apparatus 100 is similar to the surgical training apparatus 10 shown in FIGS. 1 and 2 in that it comprises a housing 140 that defines an internal cavity 132. The housing 140 is provided with an externally-facing opening 148 to allow access by a trainee to the internal cavity 132. At least one internal anatomy 130 is positioned within the internal cavity 132. A cover 142 is provided for concealing the opening 148. The cover 142 is made from a flexible material and may be of a substance which is penetrable by a surgical instrument. Cameras 114 are provided within the housing 140 that have visual access to the internal cavity 132. A transmitter 103 is operably interconnected to the cameras 114 for transmitting images of the internal cavity 132 to at least one receiver located externally of the housing 140.

The surgical training apparatus 100 further comprises a base 102 defining a base cavity 104 and a base cover 110 for concealing the base cavity 104 to which the housing 140 is mounted to. The base cavity 104 houses the transmitter 103 which comprises a rechargeable battery 106 and a computing device 108 having an integral wireless router as described above.

Mounted to the top surface of the base cover 110 are camera systems 112, a LED light strip 128 and internal anatomy mounts 126 which are all positioned within the internal cavity 132 when the housing 140 is mounted to the base cover 110. The camera systems 112 comprise cameras 114 as described above mounted to a camera mount 116. The camera mount 116 adjustably connects to a track or rail 120 which extends between a first stanchion 122 and a second stanchion 124. A handle 118 also attaches to the camera mount 116 to selectively move the camera mount 116 along the rail 120 and retain the camera mount 116 in one position along the rail 120. The handle 118 may extend through a slot 146 formed in the housing 140 such that it is movable from outside of the internal cavity 132. In one embodiment, the handle 118 may attach to the camera mount 116 using a threaded connection which also acts as a set screw in communication with the rail 120. By rotating the handle 118, the threaded connection either engages or disengages the rail 120, thereby selectively retaining the camera mount 116 at one position along the rail 120 or allowing the camera mount 116 to move along the rail 120.

Alternatively, the handle 118 may be replaced with a servo motor connected to the computing device 108. A user may control the position of the camera 114 along the rail 120 by remotely connecting to the computing device 108 and controlling the servo motor to move the camera 114 and camera mount 116 along the rail 120.

The surgical training apparatus 100 may also be provided with an external camera 115 located outside of the housing 140 which is operably interconnected to the computing device 108. The external camera 115 may be wired to the computing device 108 or wirelessly connected to the computing device 108 and may be manually movable to plurality of positions outside of the housing 140.

The LED light strip 128 is operably coupled to the battery 106 and may be mounted to base cover 110 such that is flush with the top surface of the base cover 110. The LED light strip 128 provides light to the internal cavity 132 to aid in the quality of images or video encoded by the cameras 114. Alternatively, the LED light strip 128 may be replaced with a single LED, multiple LEDs, a fluorescent light or an incandescent light and may be configured to illuminate a variety of colors.

A control panel 144 may be mounted to the housing 140 for controlling different components of the surgical training apparatus 100. For example, a user may use the control panel 144 to turn on and off power to the computing device 108, cameras 114, external camera 115 and LED light strip 128. In another example, the control panel 144 may be provided with servo controls to control servo motors attached to the camera mounts 116. It may also have controls to alter the intensity of the and LED light strip 128.

The housing 140 may have at least one external topographical feature representative of an external appearance of an exterior animal anatomical feature. The external topographical feature may be representative of a portion of the human body, such as a human torso as illustrated. The cover 142 is used to simulate soft tissue and may be formed from a plastic or foam material having a density simulating the density of animal tissue, through which the at least one internal anatomy 130 is accessed. The cover 142 may also be at least partially formed from materials such as silicone or urethane to simulate human skin.

The internal anatomy 130 comprises at least one skeletal portion, at least one muscular portion, at least one vascular portion, or at least one organ and may be representative of a portion of a human body such as an internal torso or a human spine as illustrated. The internal anatomy 130 may also have at least one pathology specific to a surgical procedure. At least a portion of the internal anatomy 130 is mounted to the base cover 110 using the internal anatomy mounts 126 and at least a portion of the internal anatomy 130 may be replaced be a new internal anatomy. The internal anatomy 130 may be formed from materials intended to simulate material characteristics of the internal anatomy they simulate. For example, the skeletal structures may be made of an acrylic or urethane having a similar density, hardness and flexibility to a human skeletal structure. The skeletal portion may also be in the form of a foam workshop bone which may have a number of anatomies related to a surgical procedure being performed placed into it.

Figure 5A:
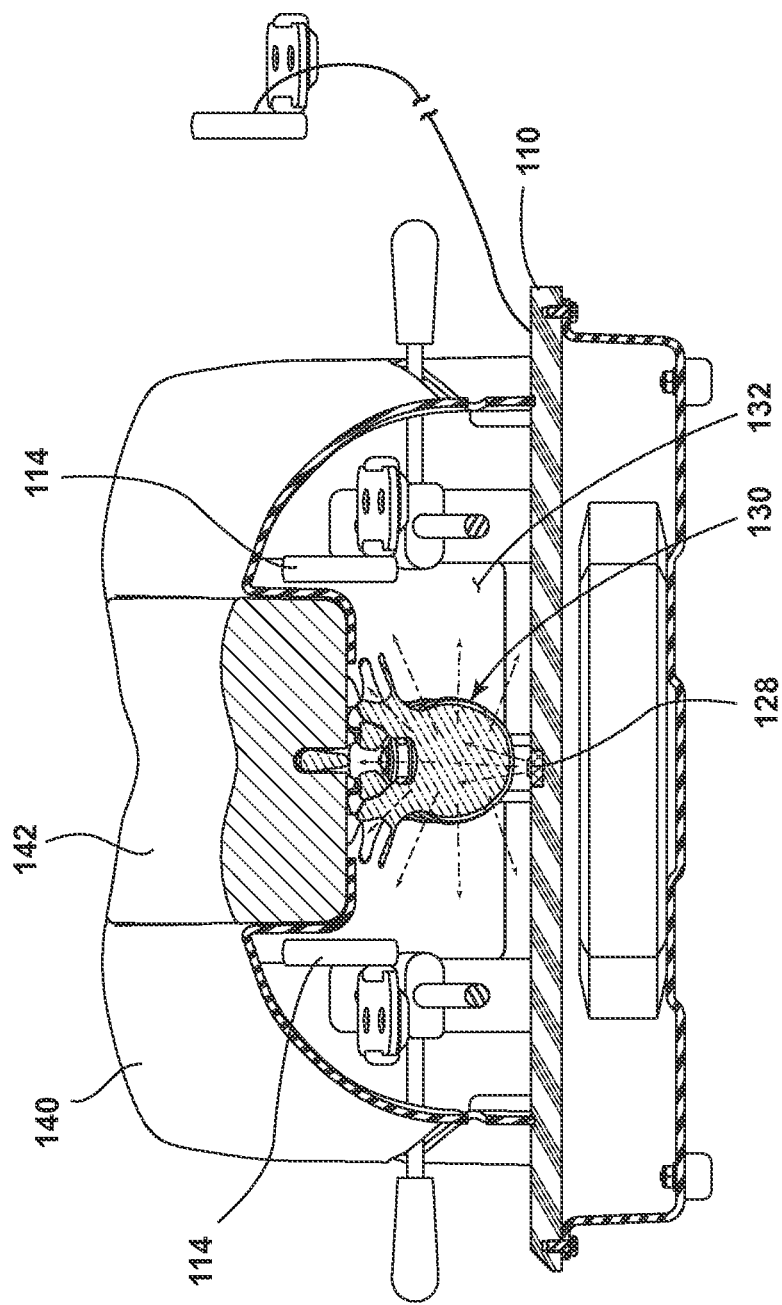
FIG. 5A is a cross sectional view of a surgical training apparatus taken along line IV-IV of FIG. 4 according to an embodiment of the invention.

The material that the skeletal structures are made from may also be translucent or a transparent to allow the skeletal structure to act as a light guide and a diffuser. As shown in FIG. 5A, the human spine skeletal structure internal anatomy 130 is positioned directly above the LED light strip 128. The light emitted from the LED light strip 128 is received by the skeletal structure which guides the light along the skeletal structure and diffuses the light in the internal cavity 132 within the housing 140. In this way, the skeletal structure acts to provide diffused light throughout the entire internal cavity 132, providing superior lighting conditions for the cameras 114. The translucent or a transparent material may also contain deposits of phosphors or the like to further enhance the diffusing characteristics and alter the wavelength of the emitted light. The top surface of the base cover 110 and interior surface of the housing 140 and cover 142 may be colored and textured to further enhance the lighting conditions in the internal cavity 132. For example, the surfaces may be white in color and textured such that they do not reflect too much light so as to avoid overexposure of the background in the images and video captured by the cameras 114.

Figure 5B:
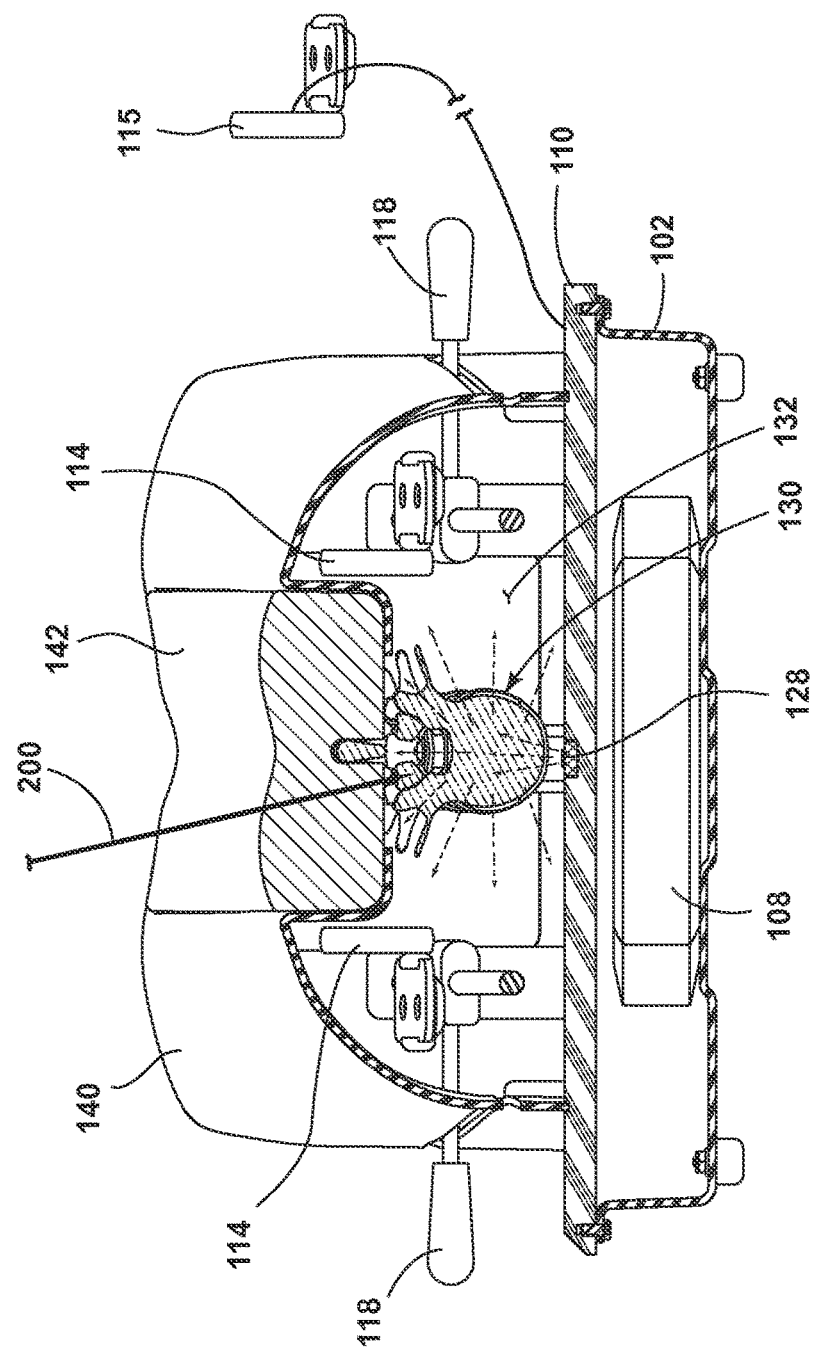
FIG. 5B is the cross sectional view of FIG. 5A having a surgical instrument inserted in the surgical training apparatus according to an embodiment of the invention.

FIG. 5B shows surgical instrument 200 inserted through the cover 142 into the illuminated internal cavity 132. A trainee may manipulate the surgical instrument 200 to practice surgical techniques, evaluate the surgical instrument 200, or to place implants. Using the handles 118, the cameras 114 may be positioned to encode images or video of the internal anatomy 130 and surgical instrument 200 during manipulation of the surgical instrument 200 by the trainee. The external camera 115 may also be positioned to encode images or video of the surgical instrument 200 and the cover 142 or of the trainee. The encoded images or video are then streamed via the computing device 108 wireless router to remote computing devices connected to the wireless router via Wi-Fi.

Figure 6B:
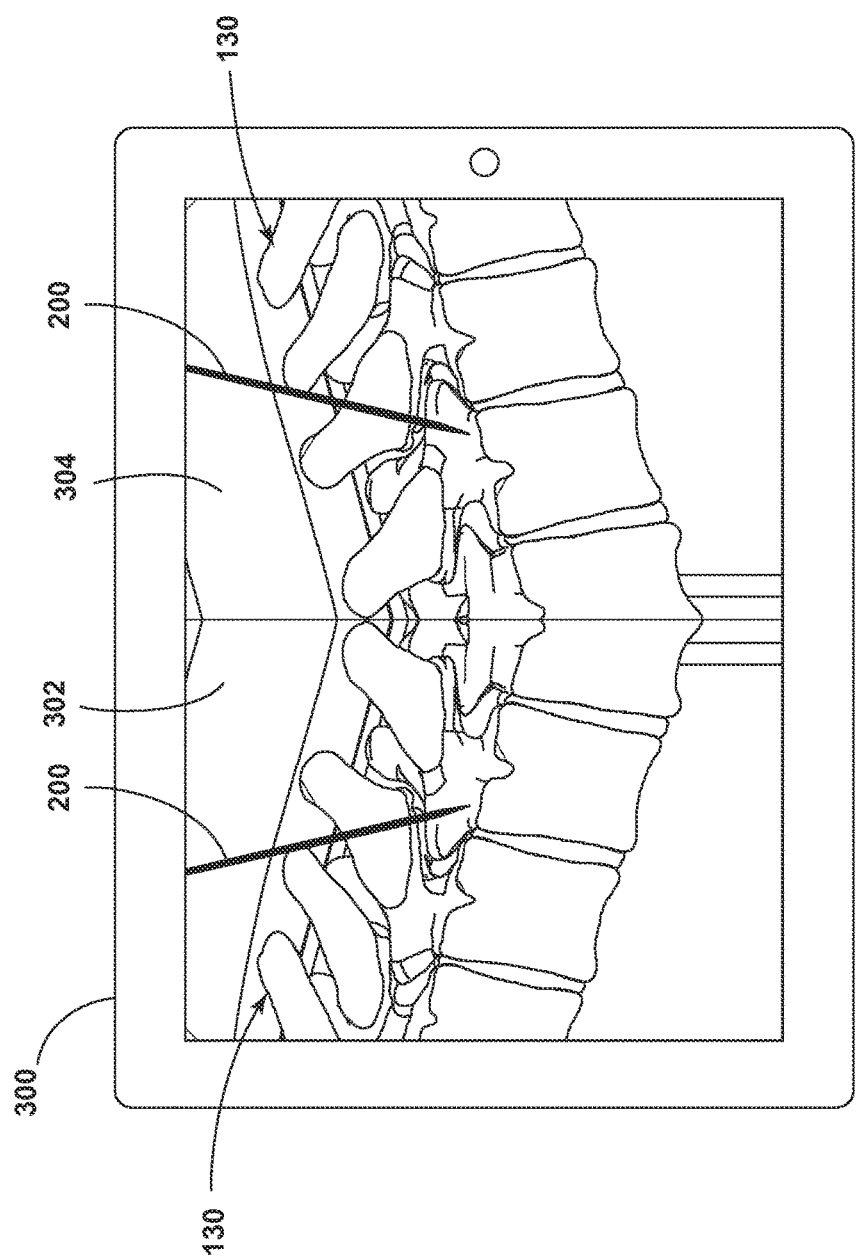
FIG. 6B is an elevation view of a display showing two views of surgical instrument inserted in a surgical training apparatus according to an embodiment of the invention.
Figure 6C:
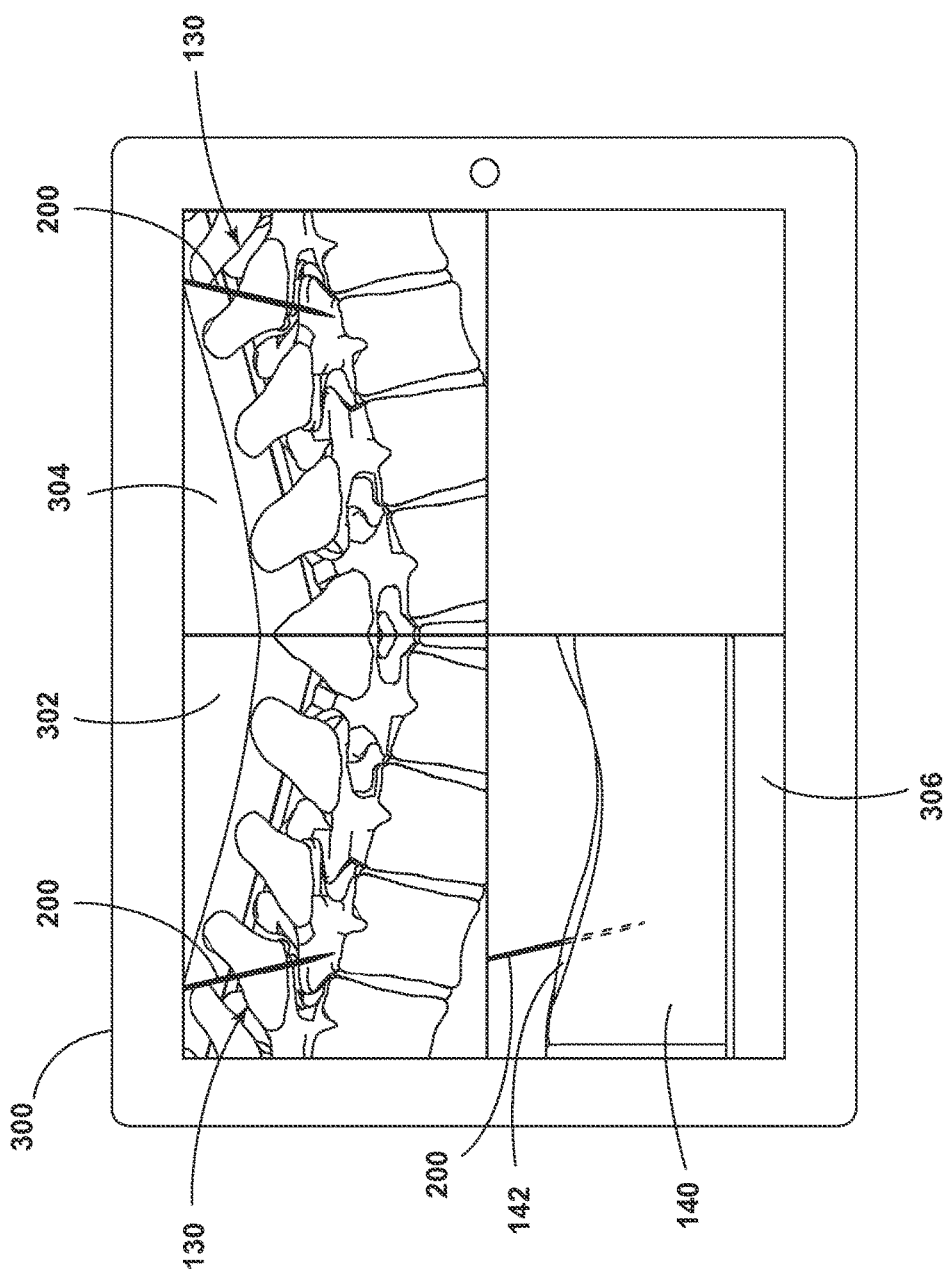
FIG. 6C is an elevation view of a display showing three views of surgical instrument inserted in a surgical training apparatus according to an embodiment of the invention.

In one embodiment shown in FIG. 6A, a remote computing device 300 displays a first camera screen 302, showing the images or video streamed from a single camera depicting the internal anatomy 130 and surgical instrument 200. In another embodiment shown in FIG. 6B, the remote computing device 300 displays the first camera screen 302 and a second camera screen 304, showing bilateral images or video streamed from two cameras depicting the internal anatomy 130 and surgical instrument 200. In another embodiment shown in FIG. 6C, the remote computing device 300 displays the first camera screen 302, the second camera screen 304 and a third external camera screen 306 showing the surgical instrument 200, the housing 140 and the cover 142. It will be understood the remote computing device 300 may display any number of screens corresponding to any number of cameras connected to the transmitter of the surgical training apparatus.

Figure 7:
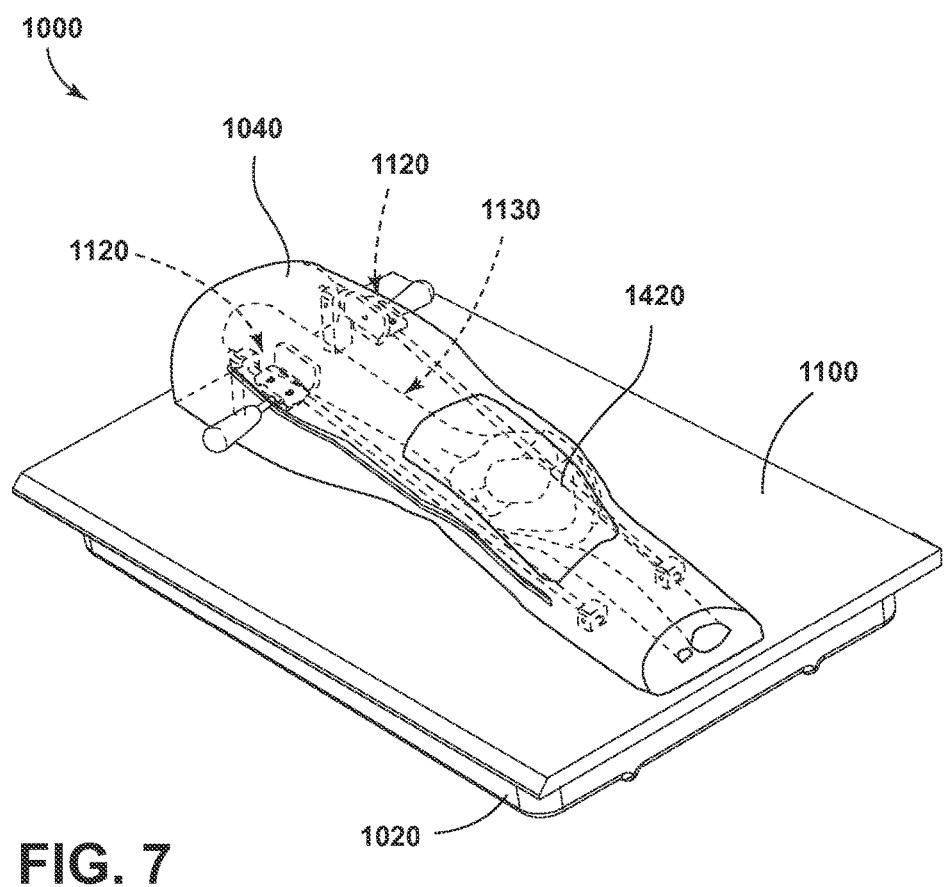
FIG. 7 is a perspective view of a surgical training apparatus according to another embodiment of the invention.

FIG. 7 shows a surgical training apparatus 1000 simulating a human leg. The surgical trainee apparatus 1000 is similar to that shown in FIGS. 3 and 4. The only differences are the shape of the housing 1040, internal anatomy 130, and cover 1420 and the length and configuration of the track or rail on the camera systems 1120. It will be understood that the surgical training apparatus according to the different embodiments of the invention may be configured to simulate any internal or external anatomy without departing from the scope of the invention.

The embodiments of the invention described herein may be used in a variety of settings. When used in the setting of a surgeon's office, a medical sales representative may use the surgical training apparatus to demonstrate a plurality of medical device products to the surgeon. The sales rep may remove the surgical training apparatus from a transport case and place it onto a table. Depending on power access, the sales rep will either plug the apparatus into a wall outlet or rely on the internal rechargeable battery to power the surgical training apparatus. Once the surgical training apparatus is powered, the computing device and wireless router will automatically generate a Wi-Fi signal. Anyone with remote computing device capable of connecting to Wi-Fi will find the associated Wi-Fi network and log onto the internet using any website address. Once the internet is accessed, live images or video of the surgical demonstration will be broadcast and displayed on the remote computing device.

When used in trade shows, the surgical training apparatus may be positioned on a display table to allow anyone within range of the Wi-Fi signal to see live images or video via any remote computing device capable of connecting to Wi-Fi. The surgical training apparatus may also be provided with a HDMI port so that it can be connected to a large screen television or projector. This will allow a medical device company to better show and demonstrate a unique medical device to surgeon patrons from the company's booth.

The surgical training apparatus may also be used to train and evaluate fellows and surgeons. By configuring the internal anatomy to simulate an internal anatomy related to a surgical procedure, a surgeon may perform a simulated surgical procedure using the surgical training apparatus while also being evaluated or receiving instructions from others viewing the surgical procedure streamed from the cameras on a remote computing device. Furthermore, the surgical training apparatus may be equipped with programs on the computing device and sensory feedback in the internal anatomy. This may allow a surgeon to be trained on various surgical procedures whereby the surgical skills can be measured and the results can be scored and analyzed. The training will point out potential surgical mistakes and indicate that further training is required in a specific area.

The inventive surgical training apparatus described herein provides for a plurality of benefits including that it provides visual images of the of the surgical instrument and internal anatomy during surgical training or demonstration without the need for cadavers and X-rays. By utilizing the internal anatomy as a light guide and diffuser, the lighting for the cameras inside the surgical training apparatus is greatly enhanced, especially when other non-translucent internal anatomies such as organs are located within the internal cavity of the surgical training apparatus. Furthermore, the integrated computing device, wireless router and power source, allow the surgical training apparatus to operate as a standalone unit which may transmit images or video from the cameras to a wide variety of remote computing devices without the need for additional software or hardware.

To the extent not already described, the different features and structures of the various embodiments of the invention may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An apparatus for simulating an animal body cavity for training surgical techniques therein comprising:
 a housing defining an internal cavity with an externally-facing opening therein for access by a trainee to the internal cavity;
 a cover made of a flexible material concealing the opening, the flexible material being made of a substance which is penetrable by a surgical instrument;
 at least one internal anatomy positioned within the internal cavity;
 at least one rail mounted to the housing within the internal cavity;
 a camera mount within the internal cavity adjustably connected to the at least one rail; and
 at least one camera mounted to the camera mount within the internal cavity and with visual access of the internal cavity and a transmitter operably interconnected to the camera for transmitting images of the internal cavity to at least one receiver located externally of the housing and wherein the position of the at least one camera within the internal cavity can be relocated with respect to the at least one internal anatomy;
 wherein the camera mount is adjustable from exterior of the housing for moving the position of the at least one camera within the internal cavity;
 whereby, a trainee can simulate a surgical procedure relating to the at least one internal anatomy by accessing the internal cavity through the cover with the surgical instrument, and visual representations of the interior of the internal cavity including the at least one internal anatomy and the surgical instrument from the at least one camera can be transmitted by the transmitter to the at least one receiver.

2. The apparatus of claim 1 wherein the at least one internal anatomy comprises at least one skeletal portion, at least one muscular portion, at least one vascular portion, or at least one organ.

3. The apparatus of claim 1 wherein the at least one internal anatomy comprises human anatomy.

4. The apparatus of claim 1 wherein the housing has at least one external topographical feature representative of an external appearance of an exterior animal anatomical feature.

5. The apparatus of claim 1 wherein the cover comprises at least one layer of foam material.

6. The apparatus of claim 5 wherein the foam material has a density simulating the density of animal tissue, through which the at least one internal anatomy is accessed.

7. The apparatus of claim 1 wherein the at least one internal anatomy comprises a portion of a human body.

8. The apparatus of claim 7 wherein the at least one internal anatomy comprises a human torso.

9. The apparatus of claim 1 wherein the at least one internal anatomy comprises a portion of a simulated human spine.

10. The apparatus of claim 1, wherein the at least one internal anatomy comprises a skeletal portion comprised of at least a portion of at least one of a translucent or a transparent material.

11. The apparatus of claim 10 and further comprising an illuminator operably connected with the internal cavity to provide light upon the at least one internal anatomy.

12. The apparatus of claim 1 and further comprising an illuminator operably connected with the internal cavity to provide light upon the at least one internal anatomy.

13. The apparatus of claim 1 wherein the rail further comprises a track extending axially along at least one side of the housing.

14. The apparatus of claim 1 and further comprising a rechargeable power source operably interconnected with the at least one camera or the transmitter.

15. The apparatus of claim 1 wherein the at least one camera or the transmitter is configured to transmit at least one of a live video stream or a periodic still image to the receiver.

16. The apparatus of claim 1 wherein the at least one internal anatomy comprises a skeletal structure comprised of at least one of a translucent or a transparent material and an illuminator positioned to direct light upon the skeletal structure so that light emitted by the illuminator is received by the at least one of the translucent or transparent material composing the skeletal structure.

17. The apparatus of claim 16 wherein the illuminator comprises at least one of a LED, an LED light strip, or an incandescent light bulb.

18. The apparatus of claim 1 and further comprising at least one replacement cover supplied with the housing to replace a previously-used cover once it has been penetrated by a surgical instrument.

19. The apparatus of claim 1 wherein the camera mount is adjustable from exterior of the housing by at least one of a handle or a motor.

* * * * *